(12) United States Patent
Gao et al.

(10) Patent No.: US 11,340,819 B2
(45) Date of Patent: May 24, 2022

(54) METHOD, DEVICE AND COMPUTER PROGRAM PRODUCT FOR LOCKING AT LEAST TWO ADDRESS REFERENCES POINTING TO STORAGE BLOCK IN RAID TYPE CONVERSION

(71) Applicant: EMC IP Holding Company LLC, Hopkinton, MA (US)

(72) Inventors: Jian Gao, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/821,398

(22) Filed: Mar. 17, 2020

(65) Prior Publication Data

US 2020/0348866 A1    Nov. 5, 2020

(30) Foreign Application Priority Data

Apr. 30, 2019    (CN) ..................... 201910361502.X (51) Int. Cl.
*G06F 3/06* (2006.01)

(52) U.S. Cl.
CPC .......... *G06F 3/0647* (2013.01); *G06F 3/0614* (2013.01); *G06F 3/0689* (2013.01)

(58) Field of Classification Search
CPC ..... G06F 3/0647; G06F 3/0614; G06F 3/0689
See application file for complete search history.

(56) References Cited

U.S. PATENT DOCUMENTS

| | | | | |
|---|---|---|---|---|
| 5,664,187 A | * | 9/1997 | Burkes | G06F 3/0601 707/999.2 |
| 5,692,178 A | * | 11/1997 | Shaughnessy | G06F 16/1774 |
| 6,282,605 B1 | * | 8/2001 | Moore | G06F 3/0614 711/103 |
| 9,460,028 B1 | * | 10/2016 | Raizen | G06F 3/0617 |
| 10,747,460 B2 | | 8/2020 | Sun et al. | |
| 10,824,361 B2 | | 11/2020 | Sun et al. | |
| 2005/0182992 A1 | * | 8/2005 | Land | G06F 3/0689 714/701 |
| 2011/0072194 A1 | * | 3/2011 | Forhan | G06F 13/24 711/103 |

* cited by examiner

*Primary Examiner* — Chie Yew
(74) *Attorney, Agent, or Firm* — BainwoodHuang (57) ABSTRACT

Techniques provide for Redundant Array of Independent Disks RAID type conversion. Such techniques involve: determining, based on a type of the target RAID, a plurality of storage spaces from a plurality of available storage disks for forming the target RAID; copying data from a first storage block of a source RAID to a corresponding second storage block in the plurality of storage spaces, wherein a first logical block address of the first storage block in the source RAID is identical to a second logical block address of the second storage block in the target RAID; determining at least one address reference associated with the first storage block; and updating the at least one address reference to point to the second storage block.

18 Claims, 6 Drawing Sheets

METHOD, DEVICE AND COMPUTER PROGRAM PRODUCT FOR LOCKING AT LEAST TWO ADDRESS REFERENCES POINTING TO STORAGE BLOCK IN RAID TYPE CONVERSION

CROSS REFERENCE TO RELATED APPLICATION

This application claims priority to Chinese Patent Application No. CN201910361502.X, on file at the China National Intellectual Property Administration (CNIPA), having a filing date of Apr. 30, 2019 and having "METHOD, DEVICE AND COMPUTER PROGRAM PRODUCT FOR RAID TYPE CONVERSION" as a title, the contents and teachings of which are herein incorporated by reference in their entirety.

FIELD

Embodiments of the present disclosure relate to the computer field, and more specifically, to a method, a device and a computer program product for RAID (Redundant Array of Independent Disks) type conversion.

BACKGROUND

In recent years, people tend to be more focused on security of data storage as the computer technology develops. Some conventional solutions may improve the reliability of data storage via Redundant Array of Independent Disks (RAID). Different types of RAIDS contain various numbers of redundant disks and accordingly exhibit different storage reliability. When using a storage system, a user may expect to upgrade the RAID to a more reliable RAID type to enhance reliability of the data storage.

SUMMARY

Embodiments of the present disclosure provide a solution for RAID type conversion.

In accordance with a first aspect of the present disclosure, there is provided a method for converting a source Redundant Array of Independent Disks (RAID) into a target RAID. The method includes: determining, based on a type of the target RAID, a plurality of storage spaces from a plurality of available storage disks for forming the target RAID; copying data from a first storage block of a source RAID to a corresponding second storage block in the plurality of storage spaces, wherein a first logical block address of the first storage block in the source RAID is identical to a second logical block address of the second storage block in the target RAID; determining at least one address reference associated with the first storage block; and updating the at least one address reference to point to the second storage block.

In accordance with a second aspect of the present disclosure, there is provided a device for converting a source Redundant Array of Independent Disks (RAID) into a target RAID. The device includes: at least one processing unit; and at least one memory being coupled to the at least one processing unit and storing instructions for execution by the at least one processing unit, the instructions, when executed by the at least one processing unit, causing the device to perform acts including: determining, based on a type of the target RAID, a plurality of storage spaces from a plurality of available storage disks for forming the target RAID; copying data from a first storage block of a source RAID to a corresponding second storage block in the plurality of storage spaces, wherein a first logical block address of the first storage block in the source RAID is identical to a second logical block address of the second storage block in the target RAID; determining at least one address reference associated with the first storage block; and updating the at least one address reference to point to the second storage block.

In accordance with a third aspect of the present disclosure, there is provided a computer program product stored in a non-transitory computer storage medium and includes machine-executable instructions which, when executed by a device, cause the device to perform any steps of the method described in accordance with the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in example embodiments of the present disclosure.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described as follows in greater detail with reference to the drawings. Although preferred embodiments of the present disclosure are illustrated in the drawings, it is to be understood that the present disclosure described herein may be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others may denote different or identical objects. The following text may also contain other explicit or implicit definitions.

Figure 1:
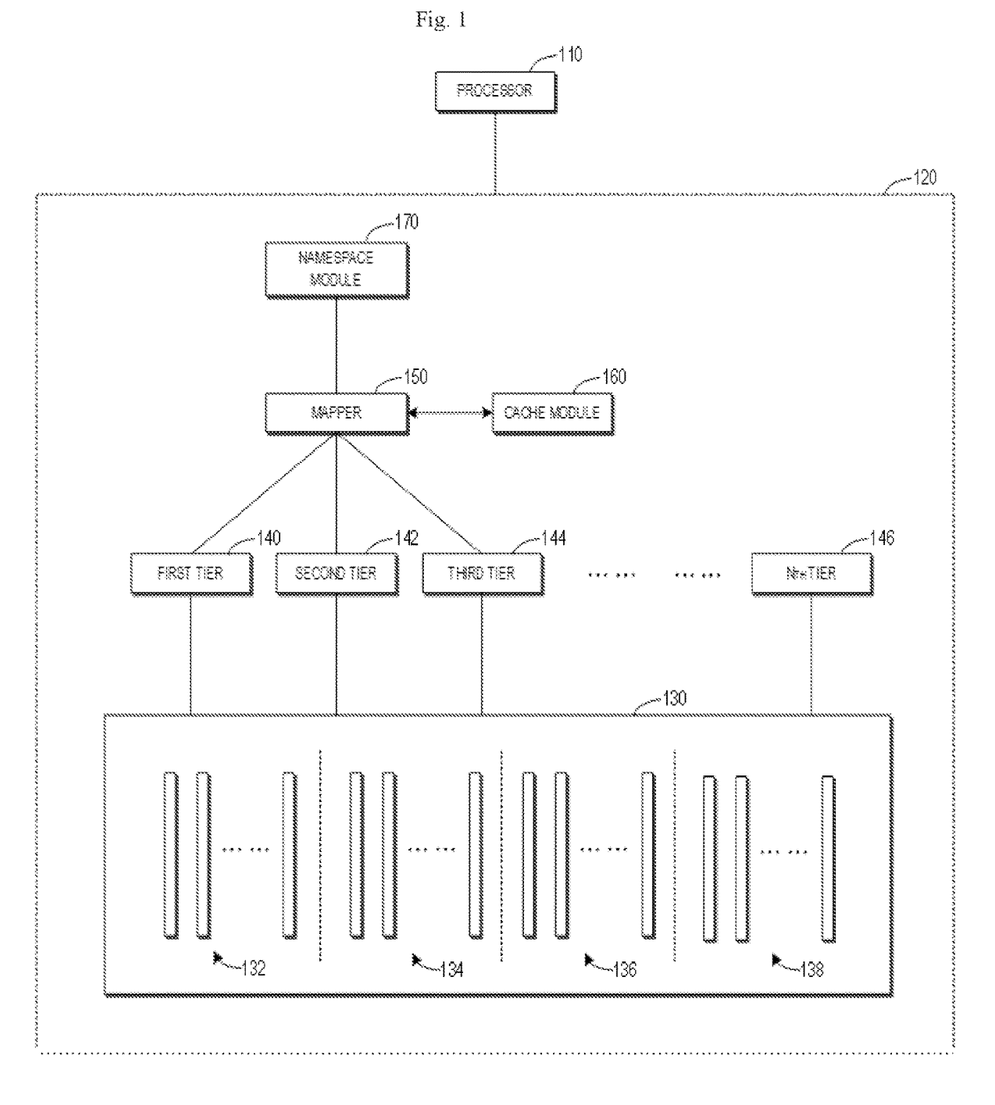
FIG. 1 illustrates a schematic diagram of an example storage system in which embodiments of the present disclosure can be implemented.

FIG. 1 illustrates a schematic diagram of an example storage system 100 in which embodiments of the present disclosure can be implemented. As shown in FIG. 1, the storage system 100 can include a processor 110 and a storage structure 120, wherein the processor 110 is used for executing operations related to the storage system 100, such as Input/Output (I/O) operations, control operations, management operations and the like. More generally, in cooperation with necessary hardware and software, the processor 110 can execute any operations associated with the storage system 100. In addition, the storage structure 120 is provided to organize and manage storage resources of the storage system 100 in an appropriate organization mode, such as various physical storage disks.

According to FIG. 1, the storage structure 120 includes a storage block pool 130, which can be used for managing all storage disks in the storage structure 120. Storage disks in the storage block pool 130 will be organized into a plurality of RAID Resilience Set (RRS) 132, RRS 134, RRS 136 and RRS 138 etc. Each RRS is a fault domain, which means if storage disks in one RRS (such as RRS 132) fail, the failure will not impact resilience of other RRS. In a general storage system, one RRS can contain up to 25 storage disks. However, embodiments of the present disclosure are not limited to the above specific value. In other embodiments, RRS can include any suitable number of storage disks.

In the storage block pool 130, each storage disk can be divided into storage blocks of fixed size. The size of each storage block can be set to 4 gigabytes (GB). However, embodiments of the present disclosure are not limited to the above specific value. In other embodiments, storage blocks in the storage disks can be set to any suitable size. Accordingly, the storage block pool 130 can be considered as being formed of a set of the storage blocks and thus can be referred to as a storage block pool.

In the storage block pool 130, a plurality of storage blocks from various storage disks can form a small-sized RAID (relative to large-scale RAID formed by a plurality of physical storage disks). The RAID can have any suitable types. For example, if the RAID type is a 4+1 RAID-5, the processor 110 can allocate 5 free storage blocks from different storage disks and combine the 5 storage blocks into a small-sized RAID to create a RAID group. In some cases, it can be required that all storage blocks in one RAID come from the same RRS. Besides, each RAID can include a plurality of RAID stripes. The size of each RAID stripe may be 2 megabytes (MB) and it is also known as Physical Large Block (PLB). It will be understood that embodiments of the present disclosure are not limited to the above values. In other embodiments, the RAID stripe can be configured in any suitable size.

Furthermore, as shown in FIG. 1, the storage block pool 130 can expose or provide some tiers to be consumed by other components, wherein the tiers include a first tier 140, a second tier 142, a third tier 144 ... an N-th tier 146 (where N is a natural number). Each tier can be composed of a plurality of RAID groups. Each tier can be applied with different RAID policies based on the stored data type. Usually, all RAIDS within the same tier can have the identical RAID strategy, meaning the same RAID width and RAID type. Each tier can be expanded on demands, i.e., the processor 110 can dynamically allocate and add a new RAID to a certain tier.

The storage structure 120 also can include a mapper 150. The mapper 150 is a core component of the storage structure 120 and may view each tier as a flat linear physical address space. In another aspect, the mapper 150 provides a single flat linear logical address space to a namespace module 170. In some cases, the logical address space can be up to 8 exabytes (EB). As an example, the mapper 150 can maintain the mapping between logical address and physical address via a B+ tree data structure in a granularity of 4 KB per page. It will be appreciated that embodiments of the present disclosure are not limited to the above specific values and specific data structures. In other embodiments, the above size of the logical address space and the granularity of the mapper can be set to any suitable values and the mapper 150 can employ other suitable data structures to maintain the mapping between logical address and physical address.

The storage structure 120 also can include a cache module 160, which can provide cache functions within a memory (not shown) and can have two instances in the storage system 100. One of the instances is for user data while the other is for metadata. The cache module 160 can offer transaction operation features to the mapper 150. It will be understood that embodiments of the present disclosure are not limited to the above specific examples. In other embodiments, the cache module 160 can have any other suitable number of instances with proper usages. Besides, the storage structure 120 also can include the namespace module 170 mentioned above. As indicated above, the namespace module 170 can consume and manage the flat linear logical space (e.g., having a size of 8EB) provided by the mapper 150. In another aspect, the namespace module 170 can create and provide storage volumes for a host (not shown) of the storage system 110 for use by the host.

In some embodiments, storage disks organized and managed by the storage structure 120 can include a variety of types of devices having storage capability, including but not limited to, Hard Disk (HDD), Solid State Disk (SSD), removable disk, Compact Disk (CD), laser disk, optical disk, Digital Versatile Disk (DVD), floppy disk, blue-ray disk, Serial Attached Small Computer System Interface (SCSI) Storage Disks (SAS), Serial Advanced Technology Attachment (SATA) storage disks and any other magnetic storage devices or any other optical storage devices or any combinations thereof.

Similarly, the processor 110 can consist of any devices that can realize control functions, including but not limited to, special-purpose computers, general-purpose computers, universal processors, microprocessors, microcontrollers or state machines. The processor 110 can be implemented as an individual computing device or a combination of computing devices, such as a combination of DSP and microprocessor, a plurality of microprocessors, one or more microprocessors in combination with DSP core, or any other such configurations.

It should be understood that FIG. 1 only schematically illustrates units, modules or components associated with embodiments of the present disclosure in the storage system 100. The storage system 100 in practice can also include other units, modules or components for other features. Therefore, embodiments of the present disclosure are not limited to specific devices, units, modules or components depicted by FIG. 1 and instead can be generally applied to any storage devices based on the RAID technology.

Figure 2:
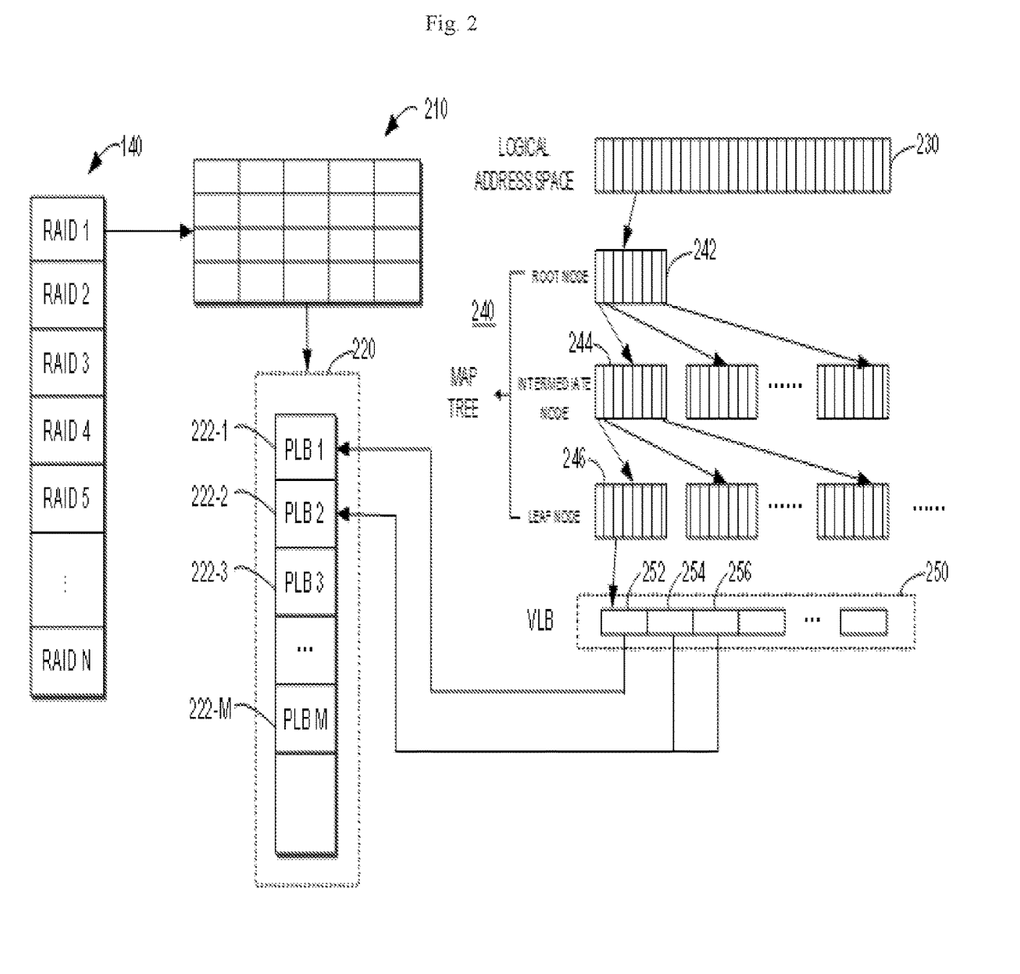
FIG. 2 illustrates an example logical-physical mapping in the mapper in accordance with embodiments of the present disclosure.

As described above, the mapper 150 provides a logical storage space to an upper tier (e.g., namespace module 170) and maps the logical storage space into a physical storage space in the storage block pool 130. FIG. 2 illustrates an example logical-physical mapping 200 in the mapper 150. According to FIG. 2, the logical address space 230 is composed of a plurality of pages. Each page can have identical size, e.g., 4 KB. Of course, other page sizes are also possible. The mapper 150 use B+ tree data structure as the mapping tree 240 and point to pages in the logical address space in the granularity of 4K page. FIG. 2 illustrates an example mapping tree 240 having a three-level B+ tree structure. It should be understood that other levels of tree structures or other types of data structures can also be used for mapping.

Taking the first tier 140 in FIG. 1 as an example, the first tier 140 can include one or more RAIDs (e.g., RAID 1, RAID 2, . . . , RAID N) as shown in FIG. 2, wherein RAID 1 210 is demonstrated in a RAID-5 type. RAID 1 210 can correspond to, for example, a physical space 220 of 64 GB. As shown, the physical space 220 can include a plurality of Physical Large Blocks (PLB) 222-1, 222-2, 222-3, . . . , 222-M (individually or collectively known as PLB 222). In some embodiments, a single PLB can be of 2 megabytes (MB).

As shown in FIG. 2, the mapping tree 240 includes a root node 242, a plurality of intermediate nodes 244 and a plurality of leaf nodes 246, wherein the nodes 242, 244 and 246 each have a plurality of entries. Each entry corresponds to a respective pointer for pointing to a next-level entry. The entries in the leaf node 246 points to pages in the logical address space. In one example, each node can include 512 pointers and each pointer points to a next-level entry or page. It is certain that the number of pointers here is only explementary and other numbers of pointers are also viable. In some implementations, a plurality of pages of the logical address space composes a larger unit virtual block, which is known as Virtual Large Block (VLB) 250 etc. The VLB 250 is stored therein with address references (address reference 252, address reference 254 and address reference 256 etc.) of the PLB 222 into the RAID 210.

As described above, when using the storage system 100, users may expect to upgrade the RAID utilized in the storage system 100, for example, upgrading the type from RAID-5 to RAID-6 to enhance stability of the storage system 100.

In accordance with embodiments of the present disclosure, there is provided a solution for RAID type conversion. In this solution, a plurality of storage spaces for forming a target RAID is firstly determined from a plurality of available storage disks based on a type of the target RAID, and data in a first storage block of the source RAID are subsequently copied into a corresponding second storage block in a plurality of storage spaces, wherein a first logical block address of the first storage block in the source RAID is identical to a second logical block address of the second storage block in the target RAID. Next, at least one address reference associated with the first storage block is determined and at least one address reference is updated to point to the second storage block. In this manner, embodiments of the present disclosure can efficiently update the RAID of the initial type in the storage system 100 to a RAID of a further type.

Figure 3:
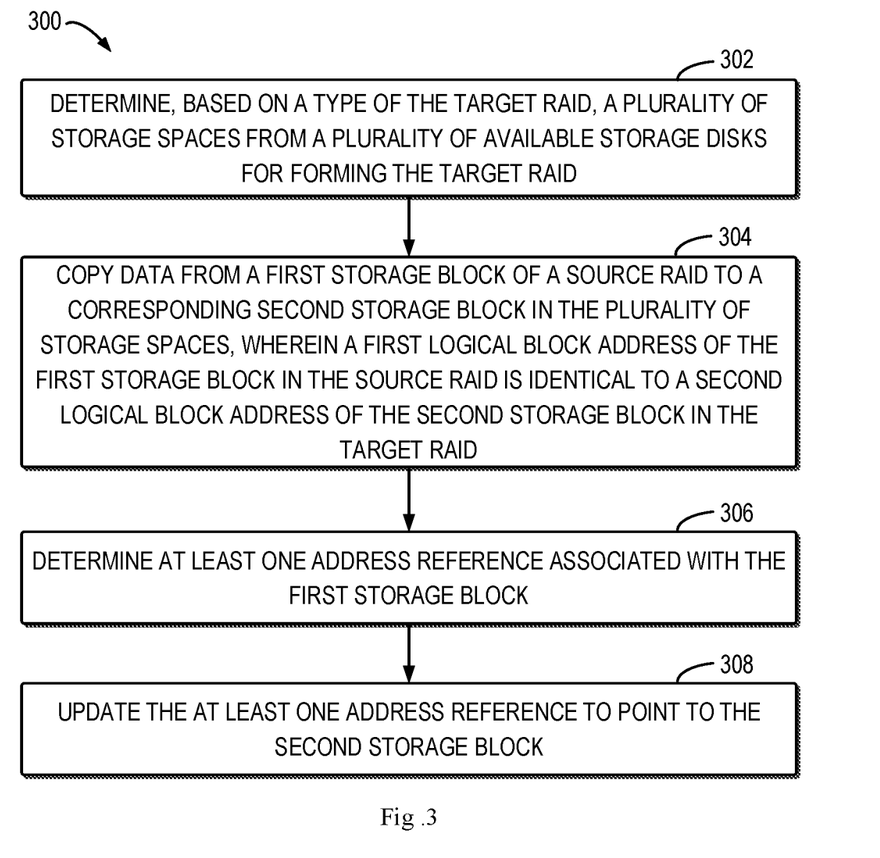
FIG. 3 illustrates a flowchart of a process of RAID type conversion in accordance with embodiments of the present disclosure.

The process of RAID type conversion in accordance with embodiments of the present disclosure is described below with reference to FIG. 3 to FIG. 6. FIG. 3 illustrates a flowchart of a process 300 of RAID type conversion in accordance with some embodiments of the present disclosure. The procedure 300, for example, can be implemented by the storage system 100 in FIG. 1. The detailed flow of the process 300 is described below with reference to FIG. 1 and FIG. 2.

At block 302, the storage system 100 determines, based on the type of the target RAID, a plurality of storage spaces for forming the target RAID from a plurality of available storage disks. The process 300 will be described below by taking the example of converting the RAID of RAID-5 type in FIG. 2 into a RAID of RAID-6 type. Specifically, when the storage system 100, for example, receives a request of upgrading the RAID-5 to the RAID-6 from a user, the storage system 100 can determine, based on the type of the target RAID (RAID-6), a plurality of storage spaces for composing the target RAID from a plurality of available storage disks (e.g., storage pool 130 shown in FIG. 1). Furthermore, the detailed flow of the process 300 will be described below with reference to FIG. 4, which illustrates a schematic diagram 400 of RAID type conversion in accordance with embodiments of the present disclosure.

Figure 4:
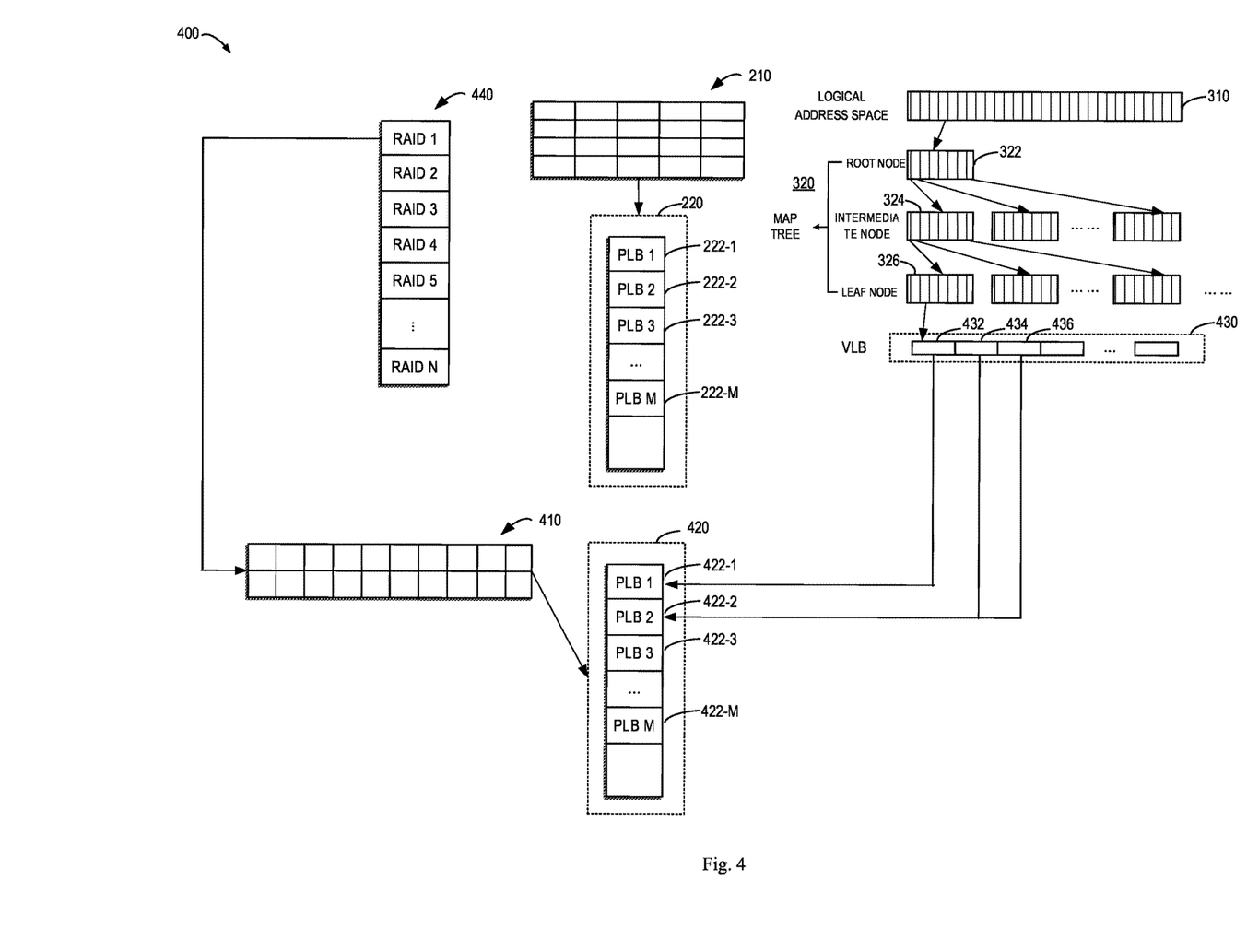
FIG. 4 illustrates a schematic diagram of RAID type conversion in accordance with embodiments of the present disclosure.

As shown in FIG. 4, the storage system 100 can receive a request of converting the source RAID 210 of the RAID-5 type into a target RAID 410 of the RAID-6 (8+2) type. It should be understood that the source RAID 210 and the target RAID 410 can have the physical space of the same size, such as 64 GB. For example, in response to receiving a conversion request from the user, the storage system 100 can determine a storage space 420 from the available storage disks for composing the target RAID 410. In some embodiments, the storage space 420 includes a plurality of storage spaces from different storage disks. The detailed process of the block 302 is described below with reference to FIG. 5.

Figure 5:
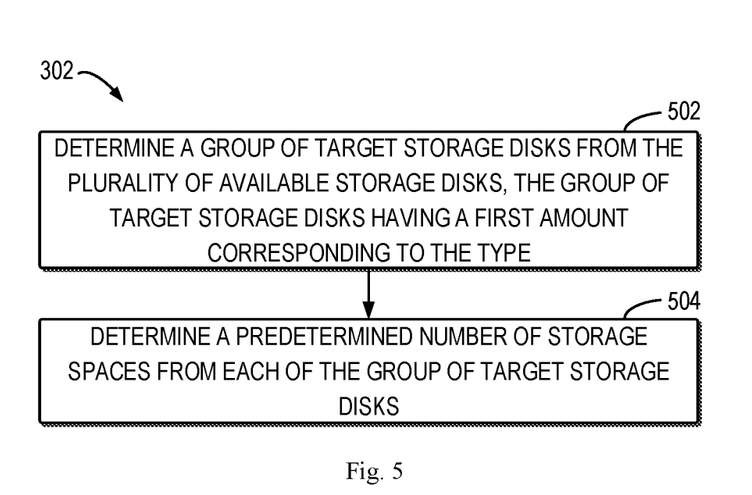
FIG. 5 illustrates a flowchart of a process for determining a plurality of storage spaces in accordance with embodiments of the present disclosure.

As shown in FIG. 5, the storage system 100 can determine, at block 502, a group of target storage disks from a plurality of available storage disks and the group of target storage disk have a first amount corresponding to the type. Specifically, taking the RAID 410 of the RAID-6 (8+2) type as the example, the storage system 100 can determine from the storage disk pool 130 10 different storage disks as the target storage disks, such that each block in the RAID is distributed into various storage disks. At block 504, the storage system 100 can determine a predetermined number of storage spaces from each of the group of target storage disks. Continuing with the example of target RAID 410, the storage system 100 can choose 2 storage spaces from each storage disk to form the target RAID 410 and the storage space in each stripe of the RAID 410 is located in different storage disks.

Referring back to FIG. 3, at block 304, the storage system 100 copies the data in the first storage block of the source RAID to a corresponding second storage block in a plurality of storage spaces, wherein the first logical block address of the first storage block in the source RAID is identical to the second logical block address of the second storage block in the target RAID. As shown in FIG. 4, the physical space 220 corresponding to the source RAID 210 includes a plurality of PLB 222 (also known as storage block 222). Taking the first storage block PLB 222-1 as an example, the storage system 100 can apply a read lock on the first storage block PLB 222-1 for preventing other requests from modifying the contents of the PLB 222-1. As shown in FIG. 4, the storage system 100 can subsequently write the data in the first storage block PLB 222-1 into a second storage block PLB 422-1 in the determined target storage space 420, wherein the PLB 222-1 and the PLB 422-1 have the same logical block address, for example, having a same shift value in the 64 GB logical space.

At block 306, the storage system 100 determines at least one address reference associated with the first storage block. In some embodiments, the storage block is stored with data contents and information for the address reference of the storage block. As shown in FIG. 2, in the example where PLB 222-1 is the first storage block, the storage system 100 can determine, based on the metadata stored in the storage block PLB 222-1, an address reference 252 pointing to the storage block 222-1 in the VLB 250. Similarly, in the example where PLB 222-2 is the first storage block, the storage system 100 can determine, based on the metadata stored in the storage block PLB 222-2, a plurality of address references 254 and 256 pointing to the first storage block 222-2 in the VLB 250.

At block 308, the storage system 100 updates at least one address reference to point to the second storage block. After copying the data in the first storage block to the second storage block, the storage system 100 also needs to update the corresponding address reference, such that a file system can access the correct storage block. Specifically, the detailed process of the block 308 is described below with reference to FIG. 6, which illustrates a flowchart of a process of updating the address reference in accordance with embodiments of the present disclosure.

Figure 6:
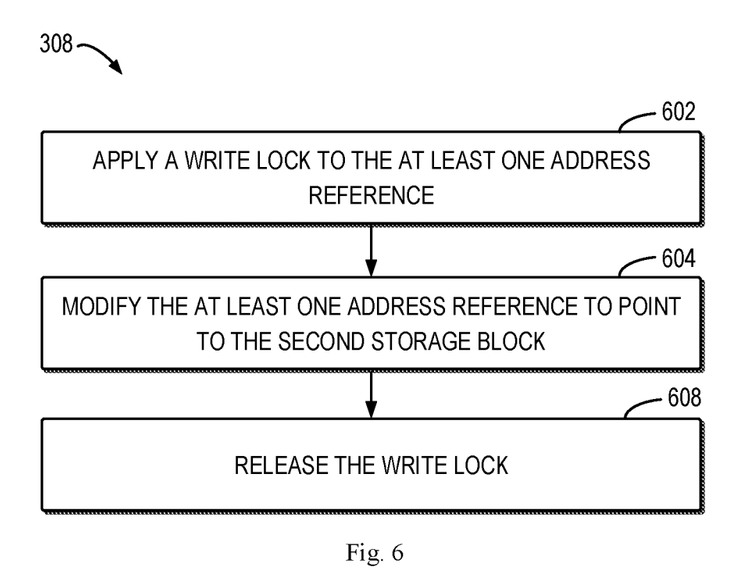
FIG. 6 illustrates a flowchart of a process of updating the address reference in accordance with embodiments of the present disclosure.

As shown in FIG. 6, the storage system 100 can apply a write lock to at least one address reference at block 602. Continuing with the example of FIG. 2 where the PLB 222-1 is the first storage block, the storage system 100 can apply a write lock to the address reference 252 for preventing other requests from reading and/or modifying the address reference 252.

At block 604, the storage system 100 can modify at least one address to point to the second storage block. As shown in FIG. 4, in the example where the storage block PLB 222-1 is the first storage block, the storage system 100 can update the address reference 252 to the address reference 432 to point to the second storage block PLB 422-1, so as to obtain the updated VLB 430. Similarly, in the example where the storage block PLB 222-2 is the first storage block, the storage system can update the address references 254 and 256 to the address references 434 and 436, to point to the second storage block PLB 422-2.

At block 606, the storage system 100 can release the write lock for the address reference, completing moving the data from the first storage block 222-1 of the source RAID 210 to the second storage block PLB 422-1 in the target RAID 410.

It should be understood that the storage system 100 can execute the process 300 for all storage blocks 222 in the source RAID 210, moving the data from the storage block 222 to the storage block 422 of the physical space 420 of the target RAID 410 and correspondingly update the address references for the storage block 222 to point to the storage block 422.

In some embodiments, after the movement of all storage blocks 222 in the RAID 210 is completed, i.e., in response to converting the source RAID 210 into the target RAID 410, the storage system 100 can further update the configuration information of the file system to replace the source RAID 210 with the target RAID 410. For example, as shown in FIG. 4, the storage system can enable the pointer to the source RAID 210 in the first tier 140 to point to the target RAID 410, to obtain the updated first tier 440. It should be appreciated that the storage system 100 can execute the above operations for all RAIDs (RAID 1 to RAID N) in the first tier 140, to convert all RAIDs into the RAID of the target type. Furthermore, the storage system 100 can perform the above operations on all RAIDs contained in all of the included tiers (first tier 140, second tier 142, third tier 144, . . . , N-th tier 146), so as to convert all RAIDs included in the storage system 100 into the target type.

In some embodiments, when the movement of all storage blocks 222 in the RAID 210 is completed, i.e., in response to converting the source RAID 210 into the target RAID 410, the storage system 100 also can release the storage space 220 associated with the source RAID 210, thereby avoiding wasting the storage space.

Based on the solution of the present disclosure, embodiments of the present disclosure can efficiently and automatically convert a plurality of RAIDs of the source type in the storage system into RAIDs of the target type, which improves the stability of the storage system without bringing additional burdens on users.

Figure 7:
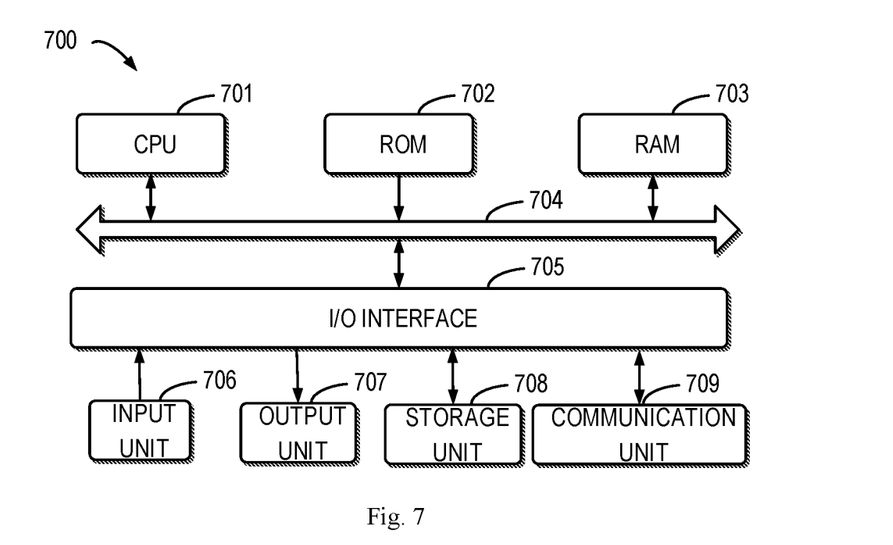
FIG. 7 illustrates a schematic block diagram of an example device for implementing embodiments of the present disclosure.

FIG. 7 shows a schematic block diagram of an example device 700 that can be used to implement embodiments of the present disclosure. For example, the storage system 100 according to embodiments of the present disclosure can be implemented by device 700. As shown, device 700 includes a central processing unit (CPU) 701 that can perform various appropriate actions according to computer program instructions stored in read only memory (ROM) 702 or loaded from storage unit 708 into a random access memory (RAM) 703. In the RAM 703, various programs and data required for the operation of the device 700 can also be stored. The CPU 701, the ROM 702, and the RAM 703 are connected to each other through a bus 704. An input/output (I/O) interface 705 is also coupled to bus 704.

A plurality of components in device 700 are coupled to I/O interface 705, including: input unit 706, such as a keyboard, mouse, etc.; output unit 707, such as various types of displays, speakers, etc.; storage unit 708, such as a disk and an optical unit, etc.; and a communication unit 709 such as a network card, a modem, a wireless communication transceiver, and the like. Communication unit 709 allows device 700 to exchange information/data with other devices over a computer network such as the Internet and/or various telecommunication networks.

The various processes and processes described above, such as method 300, may be performed by processing unit 701. For example, in some embodiments, method 300 can be implemented as a computer software program that is tangibly embodied in a machine readable medium, such as storage unit 708. In some embodiments, some or the entire computer program may be loaded and/or installed onto device 700 via ROM 702 and/or communication unit 709. One or more actions of method 300 described above may be performed when a computer program is loaded into RAM 703 and executed by CPU 701.

The present disclosure can be a method, device, system and/or computer product. The computer product can include a computer readable storage medium with computer readable program instructions for performing various aspects of the present disclosure thereon.

A computer readable storage medium may be a tangible device that can hold and store the instructions used by the instruction execution device. The computer readable storage medium can be, for example, but not limited to, an electrical storage device, a magnetic storage device, an optical storage device, an electromagnetic storage device, a semiconductor storage device, or any suitable combination of the foregoing. More specific examples (non-exhaustive list) of computer readable storage media include: portable computer disks, hard disks, random access memory (RAM), read only memory (ROM), erasable programmable read only memory (EPROM) or flash memory), static random access memory (SRAM), portable compact disk read only memory (CD-ROM), digital versatile disk (DVD), memory stick, floppy disk, mechanical encoding device, for example, the hole card with instructions stored thereon or raised structure in groove, and any suitable combination of the above. The computer readable storage medium as used herein is not to be interpreted as a transient signal itself, such as a radio wave or other freely propagating electromagnetic wave, an electromagnetic wave propagating through a waveguide or other transfer medium (e.g., a light pulse through a fiber optic cable), or the electrical signal transferred through a wire.

The computer readable program instructions described herein can be downloaded from a computer readable storage medium to various computing/processing devices, or downloaded to an external computer or external storage device over a network, such as the Internet, a local area network, a wide area network, and/or a wireless network. The network may include copper transfer cables, fiber optic transfers, wireless transfers, routers, firewalls, switches, gateway computers, and/or edge servers. A network adapter card or a network interface in each computing/processing device receives computer readable program instructions from the network and forwards the computer readable program instructions for storage in a computer readable storage medium in each computing/processing device.

Computer program instructions for performing the operations of the present disclosure may be assembly instructions, instruction set architecture (ISA) instructions, machine instructions, machine related instructions, microcode, firmware instructions, state setting data, source code or object code written or in any combination of one or more programming languages including object oriented programming languages, such as Smalltalk, C++ and so on, as well as conventional procedural programming languages, such as "C" language or similar programming language. The computer readable program instructions can be executed entirely on the user's computer, partly on the user's computer, as a stand-alone software package, partly on the user's computer and partly on the remote computer, or entirely on the remote computer or server. In the case of a remote computer, the remote computer can be connected to the user's computer through any kind of network, including a local area network (LAN) or wide area network (WAN), or can be connected to an external computer (e.g., using an Internet service provider to access the Internet connection). In some embodiments, the customized electronic circuit, such as a programmable logic circuit, a field programmable gate array (FPGA), or a programmable logic array (PLA), can be customized by utilizing state information of computer readable program instructions. The electronic circuit can execute computer readable program instructions to implement various aspects of the present disclosure.

Various aspects of the disclosure are described herein with reference to flowcharts and/or block diagrams of methods, devices (systems) and computer products according to embodiments of the present disclosure. It will be understood that each block of the flowchart illustrations and/or block diagrams, and combinations of blocks in the flowcharts and/or block diagrams can be implemented by computer readable program instructions.

These computer readable program instructions can be provided to a processing unit of a general purpose computer, a special purpose computer or other programmable data processing apparatus to produce a machine such that when the instructions are executed by processing unit via a computer or other programmable data processing apparatus, devices that implement the functions/acts specified in one or more of the flowcharts and/or block diagrams are produced. The computer readable program instructions can also be stored in a computer readable storage medium that causes the computer, programmable data processing device, and/or other device to operate in a particular manner, such that the computer readable medium storing the instructions includes an article of manufacture that includes instructions for implementing various aspects of the functions/acts recited in one or more blocks of the flowcharts and/or block diagrams.

Computer readable program instructions can also be loaded onto a computer, other programmable data processing device, or other device to perform a series of operational steps on a computer, other programmable data processing device or other device to produce a process that a computer is implemented such that instructions executed on a computer, other programmable data processing apparatus, or other device implement the functions/acts recited in one or more of the flowcharts and/or block diagrams.

The flowchart and block diagrams in the drawings illustrate the architecture, functionality, and operation of possible implementations of devices, methods, and computer products according to various embodiments of the present disclosure. In this regard, each block in the flowchart or block diagram can represent a module, a program segment, or a portion of an instruction, module, the program segment, or a portion of the instruction includes one or more executable instructions for implementing principles. In some alternative implementations, the functions noted in the blocks may also occur in a different order than those illustrated in the drawings. For example, two consecutive blocks may be executed substantially in parallel, and they may sometimes be executed in a reverse order, depending upon the functionality involved. It is also noted that each block of the block diagrams and/or flowcharts, and combinations of blocks in the block diagrams and/or flowcharts, can be implemented in a dedicated hardware-based system that performs the specified function or action of principle or can be implemented with a combination of dedicated hardware and computer instructions.

The embodiments of the present disclosure have been described above, and the foregoing description is illustrative, not limiting, and not limited to the disclosed embodiments. Numerous modifications and changes will be apparent to those skilled in the art without departing from the scope of the invention. The choice of terms used herein is intended to best explain the principles, practical applications, or technical improvements of the techniques on the market, or enable other ordinary technical staffs in the art to understand the embodiments in the disclosure.

We claim:

1. A method for converting a source Redundant Array of Independent Disks (RAID) into a target RAID, comprising:
determining, based on a type of the target RAID, a plurality of storage spaces for forming the target RAID, wherein the plurality of storage spaces is determined from a plurality of available storage disks;
copying data from a first storage block of the source RAID to a corresponding second storage block in the plurality of storage spaces, wherein a first logical block address of the first storage block in the source RAID is identical to a second logical block address of the second storage block in the target RAID;
determining at least two address reference pointing to the first storage block, wherein the at least two address references are located within a mapping tree data structure used to map a logical storage space to a physical storage space;
and updating the at least two address references to point to the second storage block, wherein the updating comprises:
applying a write lock to the at least two address references;
modifying the at least two address references to point to the second storage block;
and releasing the write lock.

2. The method of claim 1, wherein determining the plurality of storage spaces comprises:
determining a group of target storage disks from the plurality of available storage disks, the group of target storage disks having a first amount corresponding to the type of the target RAID; and
determining a predetermined number of storage spaces from each of the group of target storage disks.

3. The method of claim 1, wherein determining the at least two address references comprises:
obtaining the at least two address references pointing to the first storage block based on metadata stored in the first storage block.

4. The method of claim 1, further comprising:
in response to completion of converting the source RAID into the target RAID, updating configuration information of a file system to replace the source RAID with the target RAID.

5. The method of claim 1, further comprising:
in response to completion of converting the source RAID into the target RAID, releasing storage space associated with the source RAID.

6. The method of claim 1, further comprising applying a read lock to the first storage block.

7. The method of claim 1, wherein the first storage block comprises a RAID stripe.

8. The method of claim 1, wherein the at least two address references are located within a virtual block indicated by a leaf node of the mapping tree data structure.

9. A device for converting a source Redundant Array of Independent Disks (RAID) into a target RAID, comprising:
at least one processing unit;
and at least one memory being coupled to the at least one processing unit, and storing instructions for execution by the at least one processing unit, the instructions, when executed by the at least one processing unit, causing the device to perform acts comprising:
determining, based on a type of the target RAID, a plurality of storage spaces for forming the target RAID, wherein the plurality of storage spaces is determined from a plurality of available storage disks;
copying data from a first storage block of the source RAID to a corresponding second storage block in the plurality of storage spaces, wherein a first logical block address of the first storage block in the source RAID is identical to a second logical block address of the second storage block in the target RAID;
determining at least two address references pointing to the first storage block, wherein the at least two address references are located within a mapping tree data structure used to map a logical storage space to a physical storage space;
and updating the at least two address references to point to the second storage block, wherein the updating comprises:
applying a write lock to the at least two address references;
modifying the at least two address references to point to the second storage block;
and releasing the write lock.

10. The device of claim 9, wherein determining the plurality of storage spaces comprises:
determining a group of target storage disks from the plurality of available storage disks, the group of target storage disks having a first amount corresponding to the type of the target RAID; and
determining a predetermined number of storage spaces from each of the group of target storage disks.

11. The device of claim 9, wherein determining the at least two address references comprises:
obtaining the at least two address references pointing to the first storage block based on metadata stored in the first storage block.

12. The device of claim 9, wherein the acts further comprise:
in response to completion of converting the source RAID into the target RAID, updating configuration information of a file system to replace the source RAID with the target RAID.

13. The device of claim 9, wherein the acts further comprise:
in response to completion of converting the source RAID into the target RAID, releasing storage space associated with the source RAID.

14. A computer program product being stored in a non-transitory computer storage medium and comprising machine-executable instructions which, when executed by a device, cause the device to perform actions to convert a source Redundant Array of Independent Disks (RAID) into a target RAID, wherein the actions include:
determining, based on a type of the target RAID, a plurality of storage spaces for forming the target RAID, wherein the plurality of storage spaces is determined from a plurality of available storage disks;
copying data from a first storage block of the source RAID to a corresponding second storage block in the plurality of storage spaces, wherein a first logical block address of the first storage block in the source RAID is identical to a second logical block address of the second storage block in the target RAID;

determining at least two address references pointing to the first storage block, wherein the at least two address references are located within a mapping tree data structure used to map a logical storage space to a physical storage space;

and updating the at least one address reference to point to the second storage block, wherein the updating comprises:

applying a write lock to the at least two address references;

modifying the at least one two address references to point to the second storage block;

and releasing the write lock.

15. The computer program product of claim 14,
wherein determining the plurality of storage spaces comprises:

determining a group of target storage disks from the plurality of available storage disks, the group of target storage disks having a first amount corresponding to the type of the target RAID; and determining a predetermined number of storage spaces from each of the group of target storage disks.

16. The computer program product of claim 14, wherein determining the at least two address references comprises:

obtaining the at least two address references pointing to the first storage block based on metadata stored in the first storage block.

17. The computer program product of claim 14, wherein the acts further comprise:

in response to completion of converting the source RAID into the target RAID, updating configuration information of a file system to replace the source RAID with the target RAID.

18. The computer program product of claim 14, wherein the acts further comprise:

in response to completion of converting the source RAID into the target RAID, releasing storage space associated with the source RAID.

* * * * *